United States Patent
Patton et al.

(10) Patent No.: US 6,912,039 B2
(45) Date of Patent: Jun. 28, 2005

(54) METHOD FOR STAGING MOTION PICTURE CONTENT BY EXHIBITOR

(75) Inventors: David L. Patton, Webster, NY (US); John R. Fredlund, Rochester, NY (US); Dale F. McIntyre, Honeoye Falls, NY (US); Carlo V. Hume, Fairport, NY (US); Michael E. McCracken, Rochester, NY (US); Arthur J. Cosgrove, Hilton, NY (US); Glenn L. Kennel, Los Angeles, CA (US); Rohan S. Khaleel, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/660,340

(22) Filed: Sep. 11, 2003

(65) Prior Publication Data

US 2005/0057724 A1 Mar. 17, 2005

(51) Int. Cl.[7] ................. G03B 19/18; G03B 21/32
(52) U.S. Cl. ........................... 352/38; 352/40
(58) Field of Search .............. 352/38, 40; 345/716, 345/772, 835; 725/74, 78, 82, 146

(56) References Cited

U.S. PATENT DOCUMENTS 6,324,519 B1 * 11/2001 Eldering .................... 705/14
2004/0078268 A1 * 4/2004 Sprogis ...................... 705/14
2004/0181819 A1 * 9/2004 Theiste et al. ............. 725/146

FOREIGN PATENT DOCUMENTS

WO  WO 01/13301 A2  2/2001  ........... G06F/17/60

OTHER PUBLICATIONS

Novation, Novad Leisure–Edition for Digital Cinema Advertising, Mar. 4, 2003.*

Avica masters Digital Cinema from post production to digital cinema delivery systems, Dec. 2, 2002.*

U.S. Appl. No. 10/309,867, filed Dec. 4, 2002, Walter C. Bubie et al.

* cited by examiner

Primary Examiner—Rodney Fuller
(74) Attorney, Agent, or Firm—Stephen H. Shaw

(57) ABSTRACT

A method for scheduling motion picture and promotional content for an audience at an exhibitor site includes the steps of: assembling an electronic play list (62) for the motion picture and for related promotional content. The play list (62) identifies at least one time slot (64) for presentation of the promotional content. An ad auction entry (32) is posted, soliciting a bid from an advertisement provider for purchase of the time slot (64). In response to a received bid, an advertisement is provided for the time slot (64) so that the advertisement can be downloaded from a networked advertisement provider.

12 Claims, 7 Drawing Sheets

| START TIME | DURATION | DISPLAY |
|---|---|---|
| 6:27:00 | 1 MINUTE | AD #1129882 |
| 6:28:00 | 0.5 MINUTES | AD #1143873 |
| 6:28:30 | 0.5 MINUTES | --OPEN-- |
| 6:29:00 | 1 MINUTE | AD #1133422 |
| 6:30:00 | 2 MINUTES | TRAILER #988772 |
| 6:32:00 | 1 HOUR, 28 MIN. | FEATURE |

FIG. 4

METHOD FOR STAGING MOTION PICTURE CONTENT BY EXHIBITOR

FIELD OF THE INVENTION

This invention generally relates to digital motion picture presentation and more particularly relates to a method for controlling the scheduling of a motion picture and related promotional material.

BACKGROUND OF THE INVENTION

In the conventional model for motion picture film display, the theater operator or other exhibitor is constrained with respect to advertising and promotional content that is shown before or after the main feature. In many conventional motion picture theaters, pre-show time (typically 15 to 20 minutes prior to scheduled showtime) is used for still-frame advertisements or trivia questions and the like. This pre-show content is typically provided as slides, projected to the screen using a carousel slide projector. Intervals of pre-show time are sold to advertisers by the exhibitor, thus allowing local advertisers to show promotional content during the time purchased. Other films containing rolling stock advertisements and trailers are provided by the film distributor to the exhibitor and are spliced together with the feature following instructions provided by the film distributor. Thus, while the local exhibitor can show some amount of local advertising, such as slides, there is limited flexibility available for adapting to audience characteristics, for selling any remaining available advertising space, for making last-minute scheduling changes, or for reporting audience metrics to an advertiser as feedback. In this conventional model, the exhibitor's role is relatively "passive"; the exhibitor follows instructions dictated by the film distributor. Any advertising content that is controlled by the local exhibitor is separately managed via an advertising content provider and is generally presented during seating time between showings.

In this way, the conventional model for advertising content and motion picture film distribution is characterized by rigid control of the entire distribution and display process, allowing minimal or no flexibility for local adaptation. Pre-show content is typically prepared, distributed, and managed on a weekly basis. Pre-show advertising suppliers sell their clients time slots for a particular set of theatre screens based on an estimate of the number of people that will see the advertising content during the pre-show time. This estimate is based upon the projected attendance for a given set of theatres during a period of time. Projected attendance is based on local theater expectations and on the features that are to be played during the stated duration. Pre-show advertising content for each slide can be replaced at suitable intervals, such as once a week, in order to fulfill the contract. Contracts are fulfilled by collecting the actual attendance data, where possible, from each theatre where the pre-show content was shown.

Referring to FIG. 1, there is shown a block diagram of a conventional motion picture film distribution system 10. A production studio 20 takes the content from content providers 22 who generate the film feature, rolling stock advertising, trailers, previews, and other content for theater display, typically as separate content films 30. Studio 20 edits, masters, and prepares print films 24 and provides them, through a distribution network 26 to theaters 28. In the conventional model of FIG. 1, studio 20 dictates what is viewed at each theater 28. This control of shown content not only relates to the film feature itself, but to any advertising or trailers, such as previews for future offerings, and the like. In the conventional arrangement, theaters 28 follow the instructions of studio 20 for display of the film feature and other related content. Typically, the operator/owner of theater 28 is required to splice trailers, rolling stock advertising, or other content with the main film feature, so that the film is shown according to specific requirements of studio 20. With the relatively inflexible arrangement shown in FIG. 1, then, there is no opportunity for dynamically adding or changing image content. Local participation and enjoyment of advertising revenues is minimized with this conventional arrangement.

One of the potential benefits of digital cinema relates to how images are stored and displayed from data. Referring to FIG. 2, there is shown a block diagram of a digital cinema preparation and distribution system 100 for providing motion picture images from a studio 110 to a post production facility 111, which digitizes the motion picture images and provides the digitized images over a transmission system 130 to an exhibition system 140, typically a movie theater. (The post production facility 111 may be under the control of the studio 110, or it may exist (as it typically would) as a separate entity in the overall system 100.) At post production facility 111, digital mastering is performed on film 112 that contains image content, such as the film feature, advertising, trailers, and the like. A datacine system 114 transforms the film content into digital image content and provides the digital image content to a rendering system 118, typically supported by a disk array 120, that renders the motion picture image data in a resolution suitable for distribution and display. Rendering system 118 may also accept input from auxiliary input devices 116 such as data tape, DS tape, and DataCam devices. The fully mastered digital cinema output then is provided as a data stream to transmission system 130, which may utilize a satellite 138 in communication with a transmitter 122 connected to post production facility 111 equipment. Other alternative transmission media include a fiber cable connection 136, or transmission using an optical medium 134, such as DVD or optical disks, or using a magnetic medium 132, such as data tape. At exhibition system 140, the mastered digital image data is received, such as at a receiver 148, an optical media reader 144, a magnetic media reader 142 or over a data or fiber optic cable connection 136. A cinema operating system 146, typically supported by disk array 120, accepts the digital input data, processes the input data stream for presentation, and provides this data for image forming and projection by one or more digital projectors 150.

Among its other anticipated benefits, digital cinema opens up new opportunities to exhibitors for increased advertising revenue. Unlike conventional operation that requires manual management of advertising slides and splicing of rolling stock promotional materials, ads and trailers can be simply programmed for showing at suitable times. Among other advantages, this makes it easier to display locally generated and provided content. Given the new capabilities of digital cinema, then, the exhibitor is now able to take on the role of programmer. The exhibitor can now select suitable advertising and promotional material to precede and follow the feature film and is no longer under the control of the motion picture distributor.

In conventional television programming, a local broadcaster provides a showing by rebroadcasting a show or program provided from a production studio. The local TV station accepts some national advertising provided from the larger TV network and provides the balance of advertising content through local and regional sales. The parameters for including local content are strictly defined, with little or no leeway for local programming changes from the instructions provided by the network. Advertising revenues are established using a probabilistic assessment of viewing audience demographics, based on sampling. Advertisers pay a price based upon the likely "number of impressions" for a preferred audience that can be obtained by airing a commercial message at a given time. However, with the salient exception of "pay-per-view" presentations, only statistically calculated metrics are available for obtaining the number of impressions of interest to advertisers for television viewing. There is no feedback channel for making any accurate measurement of audience demographics with conventional TV programming methods. There is no flexibility available for adapting to audience situations, including spontaneous adjustment of starting times for feature presentations, for example.

It is recognized that it would be valuable for the motion picture exhibitor to take advantage of program scheduling capabilities for obtaining increased advertising revenue and for adapting presented material more suitably to the audience. However, while the exhibitor now has capability to execute a programming role, adapting the TV-based programming model would be constraining and provides few advantages for the exhibitor. For example, TV programming follows rigid scheduling rules, with interruptions to fixed schedules only under special circumstances. Broadcast times themselves are fixed by the major networks, with local affiliate stations operating merely in a re-broadcasting mode. Specific intervals of advertising space are sold with consideration of factors such as time of day, likely audience characteristics, and relative demand. However, with TV, there is no accurate method for assessing the actual number of viewers who watch a particular commercial; statistical estimation is used to approximate the number of impressions, as described above.

Unlike TV, the motion picture theater environment is well known and controlled. Significantly, the number of ticket sales can be quickly determined, so that data of interest to an advertiser, such as "number of impressions" data, can readily be obtained. Other data of interest that may be available can include demographic information about the audience, such as percentage of the audience who are within a certain age grouping, for example. Information on audience conditions, such as percentage of the audience seated, is readily available to theater management. Timing of motion picture showings can allow for some flexibility, such as delaying the start of a feature film until a higher percentage of the audience is seated, for example.

Clearly, the conventional model for motion picture exhibition has developed over time and works profitably. And while digital cinema offers new opportunities for profit, methods of operation must also change accordingly in order to take advantage of these opportunities. Some conventional practices of TV broadcasting could be adapted, but these approaches do not take full advantage of the dynamics of the motion picture exhibition environment.

Tools and techniques for electronic control of scheduling for digital motion pictures and related content have been proposed. One example scheduling tool is the Avica Digital Cinema Manager from Avica Technology Corporation, Santa Monica, Calif. (www.avicatech.com). The Avica software maintains an electronic playlist for scheduling feature films, ads, and related content stored on a server within a motion picture exhibition facility. Commonly assigned patent application U.S. Ser. No. 10/309,867 filed 04 Dec. 2002 in the names of Walter C. Bubie et al. and entitled "Streamlined Methods and Systems for Scheduling and Handling Digital Cinema Content in a Multi-Theatre Environment" describes methods for creation, graphic display, and maintenance of electronic playlists stored on a central server for a multi-screen exhibition facility. However, these proposed solutions do not provide methods for competitive bidding to obtain promotional time intervals. Feature film and promotional content are server-resident with these solutions, stored at the exhibition site rather than downloaded for display on an as-needed basis. Using these tools, an operator can make decisions regarding appropriate content for promotional materials such as rolling stock or fixed stock advertising or trailers that accompany a feature film. However, informational guidelines for this promotional material are not provided with the feature film itself.

Due to constraints of conventional motion picture methods, local exhibitors have not been able to take advantage of networked tools for soliciting local promotional material, nor are they able to take advantage of the inherent flexibility offered by digital cinema technology. In one attempt to provide motion picture exhibitors with more flexible advertising options, the disclosure of WIPO application WO 01/13301 (Sprogis) describes a system using HTML structures and tools for providing an alternative to conventional fixed stock slide presentations. The systems and methods of the Sprogis disclosure provide a potentially more animated and versatile display for advertising messages, notices and information on upcoming events, and related information following the model of frames in an internet web browser utility. Utilizing conventional networked tools for web content delivery, the system disclosed by Sprogis not only allows advertisers to regularly update message content, but also enables backchannel reporting of exposures provided for the HTML content. While this type of system can provide a suitable replacement for many types of fixed stock slide presentations, it falls short of a comprehensive solution for integrating promotional content with the overall motion picture experience. For example, separate digital projection equipment is used to project the HTML frames onto the display screen. When scheduled rolling stock, trailers, and motion picture film feature are ready to run, a separate system is used both for control and projection. Thus, any coordination of the overall theater experience must be supplied from outside, using such a system as a sophisticated replacement for slide projection equipment, to be activated at suitable times.

Thus it can be seen that there is a need for a method for programming a motion picture showing and its related advertising materials that integrates different types of entertainment and promotional content and allows adaptation to audience size and other metrics and conditions and that provides additional opportunities for enhancing profitability for motion picture exhibitors.

SUMMARY OF THE INVENTION

It is an object of the present invention to enable a motion picture exhibitor to take advantage of opportunities for more flexible programming of promotional content that precedes or follows a feature film.

The present invention is directed to overcoming one or more of the problems set forth above. Briefly summarized, according to one aspect of the present invention, the present invention provides a method for scheduling motion picture and promotional content to an audience at an exhibitor site, the method comprising:

(a) assembling an electronic play list for the motion picture and for related promotional content, said play list identifying at least one time slot for presentation of promotional content;

(b) posting an electronic notice soliciting a bid from an advertisement provider for purchase of said at least one time slot;

(c) in response to a received bid, associating an advertisement from said advertisement provider with said at least one time slot in said play list;

(d) acquiring said advertisement electronically from said advertisement provider.

It is a feature of the present invention that the electronic play list is acquired or created and is stored on a server computer at the exhibitor's site.

It is an advantage of the present invention that it allows automation of feature film and promotional material presentation, eliminating the need for manually splicing separate film content together. Ads, trailers, and other promotional material can be downloaded or otherwise acquired at any time prior to the showing, including "live" presentation.

It is a further advantage of the present invention that it allows flexible control to the exhibitor for scheduling the material that is displayed, where this control can be exercised either at a single exhibition facility or at a central site for managing multiple exhibition facilities. Last minute changes can be accommodated to suit individual circumstances at a particular theater or other exhibition site.

It is a further advantage of the present invention that it allows a central management site or an exhibitor to solicit local or national advertising content shown with a feature film, for a group of theaters or on a theater-by-theater basis. The exhibitor can auction available advertising or promotional time to the highest bidder.

It is a further advantage of the present invention that it provides more effective tools for assessing advertising impact and measuring and reporting advertising exposure, thereby presenting opportunities for increased advertising revenues to the exhibitor.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

FIG. 4 is a plane view representation of a portion of a play list generated according to the present invention.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
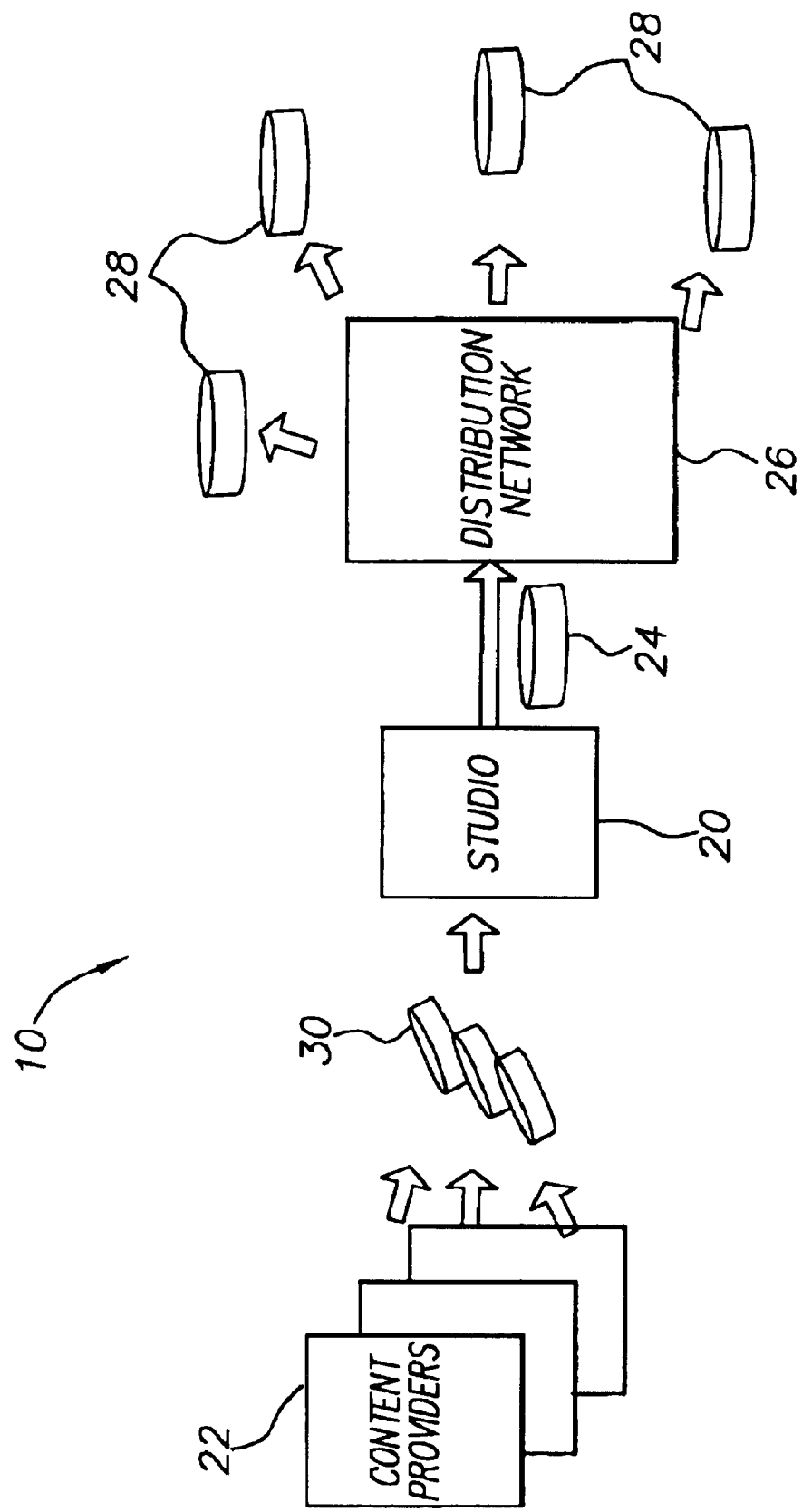
FIG. 1 is a schematic block diagram showing a conventional system for motion picture film preparation and distribution.
Figure 2:
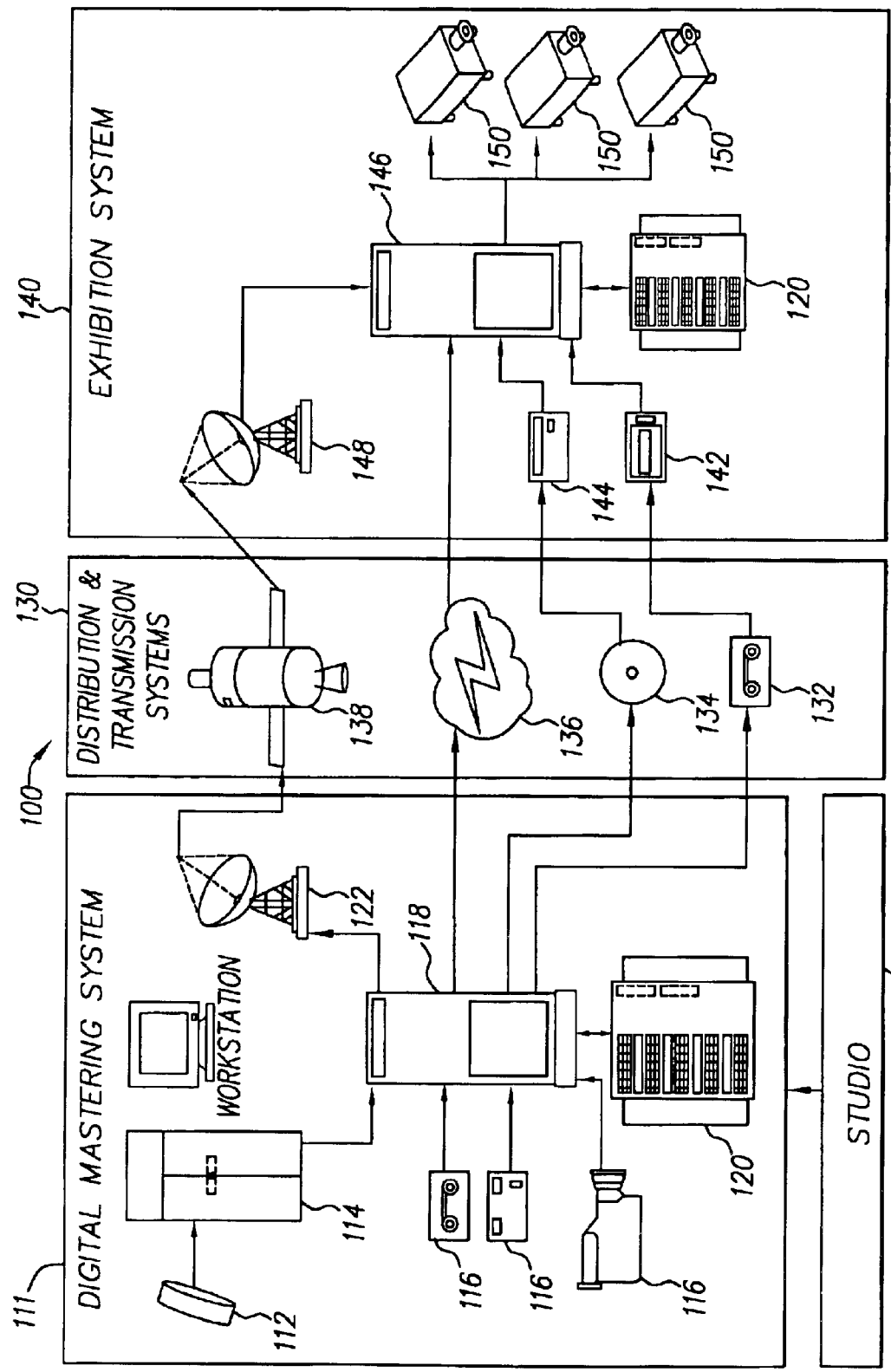
FIG. 2 is a schematic block diagram showing a system for mastering and providing digital motion picture data, such as could be used when implementing the present invention.
Figure 3:
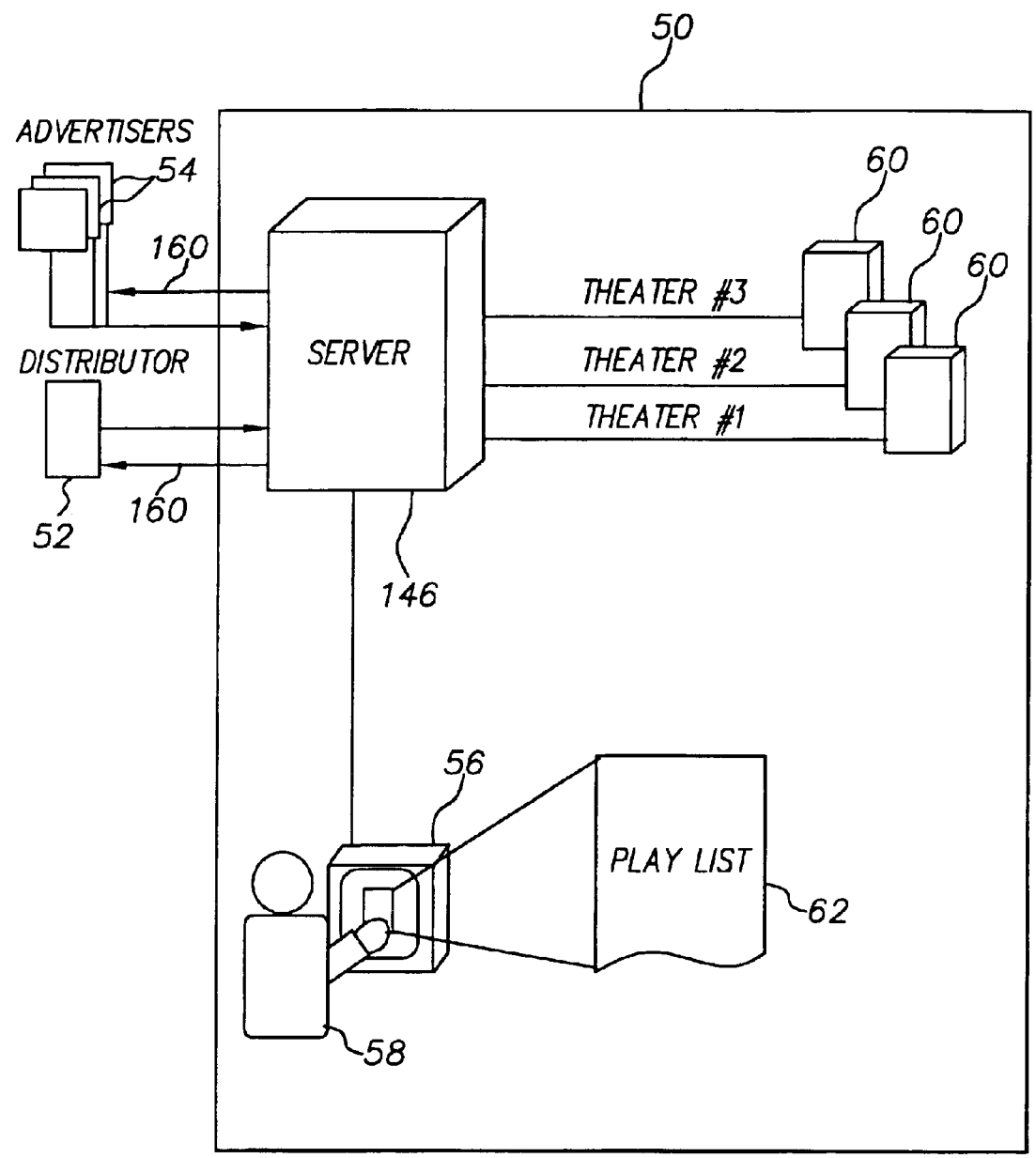
FIG. 3 is a schematic block diagram showing an exhibitor site for controlling a number of individual theaters.

Referring to FIG. 3, there is shown an arrangement of components at an exhibitor site 50. Cinema operating system 146 acts as the server for receiving the digital image data stream for a motion picture feature, as was described with reference to FIG. 2. A distributor 52 provides the motion picture feature. Advertising and promotional content may also be provided as a digital data stream, both from distributor 52 and from one or more advertisers 54. Advertisers 54 may be, for example, advertising agencies or buyers whose function is to strategically place ads for their clients.

On a control console 56, an operator 58 stages the scheduling of motion picture feature and promotional content components for one or more theaters 60. Theaters 60 may be in the same building or may be located at a distance from each other. Operator 58 performs this staging by setting up an electronic play list 62 for each theater 60.

Electronic Play List Setup

Referring to FIG. 4, there is shown an example electronic play list 62 consisting of time slots 64. A start time 66 and a duration 68 are identified within each time slot 64. Time slot 64 may have assigned content 69 or may be open and available. A feature entry 72 shows the time period that is assigned to the main feature itself.

Software on control console 56 manages the setup of each electronic play list 62, allowing automatic or manual assignment of individual time slots 64. Rules provided by distributor 52 or encoded with data provided for or along with the motion picture feature may dictate specific show times or may stipulate what types of promotional material are permitted within certain time slots 64. For example, many distributor agreements currently require that the exhibitor only show trailer content once a scheduled showtime is reached, so that other types of advertisements, such as slides, do not immediately precede a showing. Or, a motion picture producer may encode various guidelines for suitable advertising content, as well as for advertising content to avoid. For example, a sports-oriented film may be a good vehicle for promotion of sports collectibles or sporting goods outlet advertising. Conversely, it may be advisable not to have airline rolling stock advertisements accompany a motion picture having a plane crash scene. An encoding scheme for identifying any number of attributes could be developed, using techniques well known in the digital encoding arts. For example, encodings could be standardized to indicate film genre, rating, targeted age group, and types of content to promote or to avoid.

Figure 5:
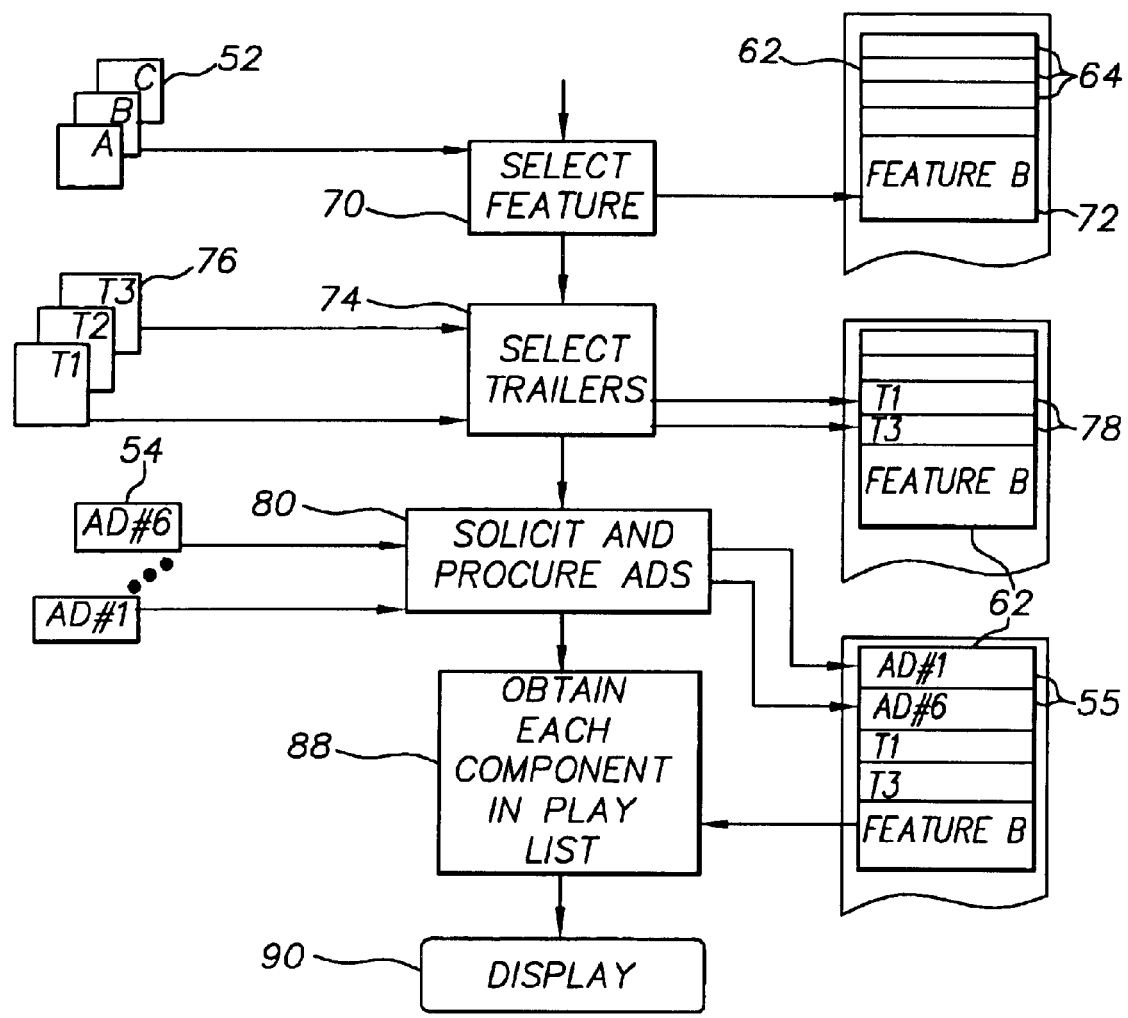
FIG. 5 is a flow diagram for setting up and using a play list.

Referring to FIG. 5, there is shown a flow diagram of the processes for generating electronic play list 62. In a feature selection step 70, operator 58 selects a feature from distributor 52 and schedules a feature entry 72 in play list 62. In a trailer selection step 74, operator 58 selects one or more trailers 76 for presentation before the feature. Operator 58 schedules a trailer entry 78 for each trailer 76, occupying one or more time slots 64. In an ad solicitation step 80, ads are solicited from advertisers 54 and an ad entry 55 for each ad is assigned to a time slot 64 when purchased.

Using the arrangement of FIG. 5, it is not necessary that the actual image data content be retrieved when play list 62 is generated. Instead, play list 62 can simply provide a list of "pointers", used to obtain the image data for each of the component entries, i.e., feature 72, trailers 78, and ads 55. The image data can be downloaded in a download step 88 to cinema operating system server 146 prior to or at the time of showing, allowing up-to-the-minute modifications, even allowing "live" promotional content at an individual showing. A final display step 90 projects the image data for feature, trailers and ads to the screen.

Standard types of editing commands would be available for arranging and modifying play list 62, including commands to edit, delete, add, move, copy, and paste entries, for example.

Ad Auction and Solicitation

Figures 6, 7:
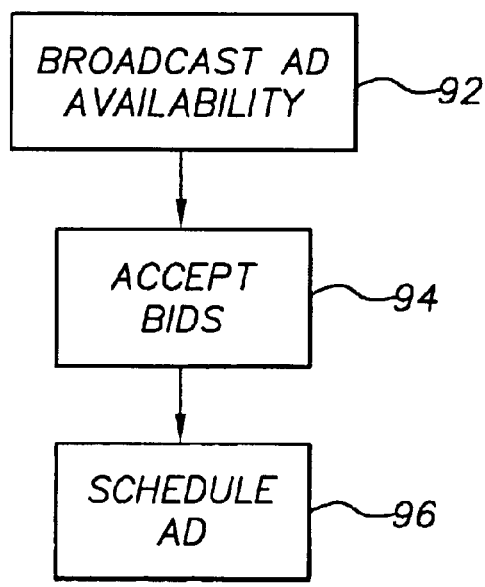
FIG. 6 is a plane view representation of an ad auction listing according to the present invention.
FIG. 7 is a flow diagram of the steps for soliciting and scheduling advertising.

With reference to the flow diagram of FIG. 5, there may be cases where distributor 52 does not provide promotional material or advertisements. In such an event, the exhibitor has the opportunity to solicit ads from advertisers 54. Solicitation can be from an individual exhibitor, such as an individual theater, or from a central facility that serves as a management site for multiple theaters. Referring to FIG. 6, there is shown an exemplary ad auction entry 32, such as would appear by accessing an on-line utility for advertising placements. Information fields 34 list data on theater location, feature, show times, and related information, including projected audience demographics such as average age and attendance percentages. A set price or a minimum price could be stated. In the embodiment shown in FIG. 6, an entry is expected in a bid price entry field 36. After entry of a bid entry, the advertiser clicks a bid control button 38 or similar on-screen control to submit a bid. Acceptance of a bid can be automated or can be monitored by exhibitor personnel. Bids may be accepted for a certain period of time, up to a predetermined interval before show time. Selection and approval of bids could be automatically performed in software or could be monitored and controlled by an operator. Confirmation of acceptance would be provided to advertiser 54 for an accepted bid.

Referring to FIG. 7, there is shown a sequence of substeps that would be part of ad solicitation step 80. In a broadcast step 92, information is posted, such as on a website, showing open time slots 64 for upcoming features. Advertisers 54 can then reserve time slots 64 by paying the listed price or may bid on available time slots 64 in an auction. In an acceptance step 94, the exhibitor accepts a bid from advertiser 54. Then, in a scheduling step 96, an ad entry 55 is made in play list 62.

Theater 60 may also solicit promotional content from advertisers for particular features or show times. For example, a feature presentation popular among teenagers has appeal to specific advertisers. Theater 60 broadcasts a message to this targeted group of advertisers indicating available time slots 64 for presentation of promotional content and accepts bids from a member of this group accordingly. Motion picture content may also motivate promotional strategies. For example, where a scene in the motion picture is filmed in a fast food restaurant, there may be advantages in soliciting advertising from local franchisees. Promotional opportunities, such as presentation of an admission ticket stub for discounted or free items, could also be available to advertisers as part of the ad auction sequence. Auction options may also include different levels or types of promotion in addition to display of fixed or rolling stock content, including reduced admissions price, promotional item giveaways, or coupons, for example. The auction option may offer the opportunity to print a coupon onto the admission ticket stub, for example.

Dynamic Changes to Play List

Figure 8:
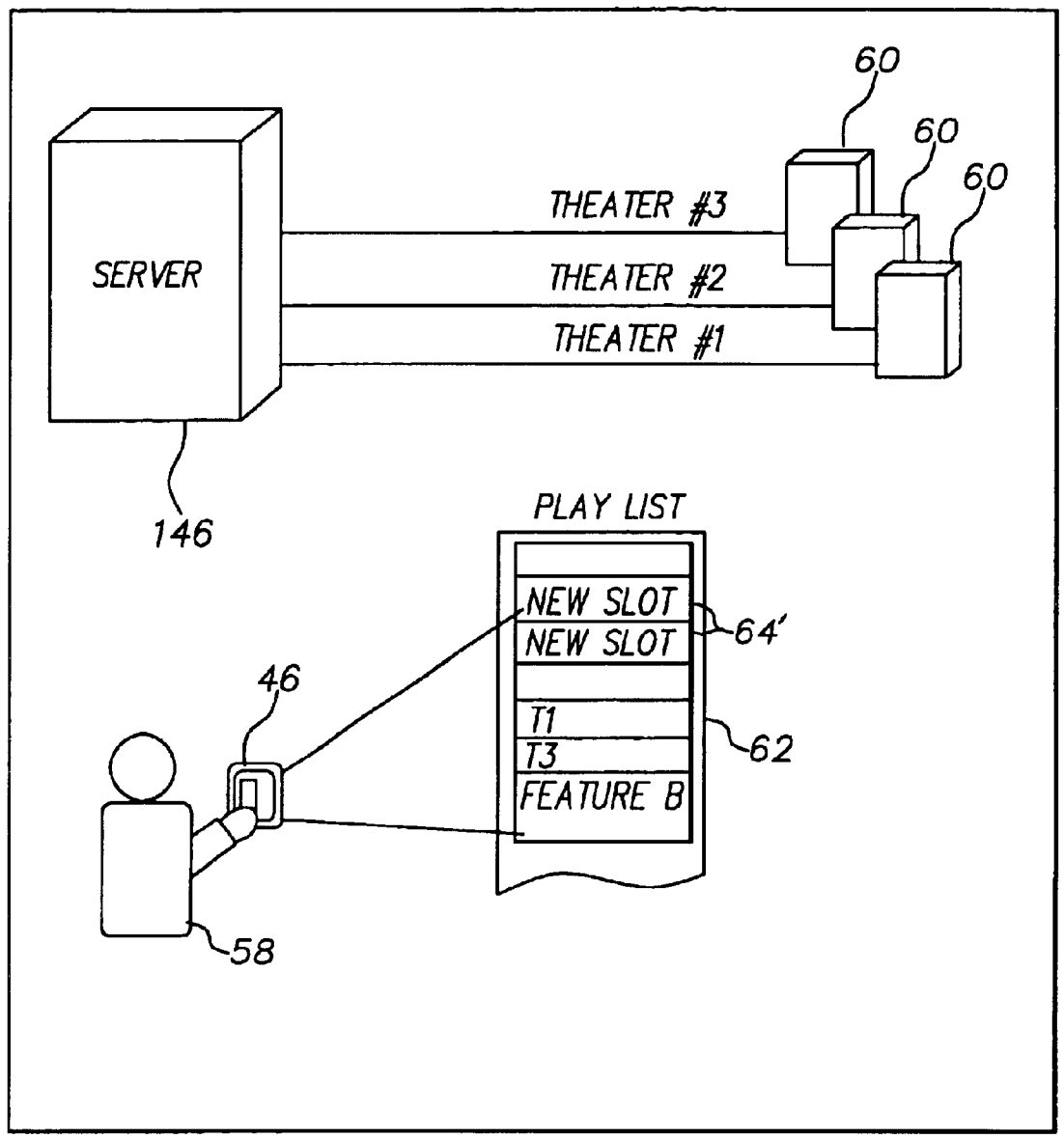
FIG. 8 is a block diagram showing an embodiment using a handheld computing device for dynamically editing the play list to adjust scheduling based on local conditions.

The method of the present invention enables a manager or other authorized operator 58 at an exhibitor site or at a central management facility to make changes to play list 62 as needed, such as when conditions at the exhibition site suggest the need for schedule modifications. Referring to FIG. 8, there is shown an alternate embodiment in which operator 58, typically a theater manager, accesses play list 62 using a portable electronic device 46, such as a Personal Digital Assistant (PDA), for example. In the example of FIG. 8, operator 58 adds supplemental time slots 64' with default or repeated advertisements or other promotional material. This may be beneficial, for example, where lines at refreshment stands are excessively long or where other audience-related conditions occur. Similarly, operator 58 may move a feature from a smaller to a larger seating area of theater 60, based on ticket sales. Accompanying a change in seating area may come a corresponding change in fee charged for promotional time slots 64, according to audience size, for example. Advertisers may or may not agree to moving ads, however, or to paying a higher fee when a feature film is moved near to show time.

In one embodiment, portable electronic device 46 is a PDA with wireless connection to cinema operating system 146. In addition to control of play list 62 and related scheduling functions, management information and functions available from the PDA can also include current data on ticket sales. Available supplemental time slots 64' could be offered to advertisers in an on-line broadcast, allowing immediate, dynamic delivery of promotional material to an audience, initiated by theater 60. Referring back to FIG. 8, software at cinema operating system 146 can automatically scan a listing of bids from advertisers and insert new promotional content accordingly into play list 62.

Feedback Channel to Advertisers

Referring back to FIG. 3, a backchannel 160 can also be provided for providing data back to advertisers 54 or to distributor 52. Data provided from the exhibitor site can include attendance numbers for a specific theater 60, to provide advertisers 54 with accurate information on number of impressions obtained for an advertisement. This information can be used for setting advertising rates, for example, by using number of impressions as a factor in determining the fee for one or more time slots 64.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the electronic play list could have any suitable format that allows scheduling and assignment of feature and promotional content to specific dates and times. Any number of methods could be used for delivery of image data content, both for the feature and for any advertising and promotional content. Automated methods could be used as well as manual methods to dynamically modify play list 62, such as triggered automatically by an audience metric such as a count of ticket sales. Automation of a number of steps is possible, allowing theater 60 significant latitude in controlling its operation and responding to audience and advertiser requirements. The present invention is ideally suited for environments using digital motion pictures and promotional content; however, displayed promotional or feature film content may be provided on film, on magnetic tape, on optical disk, or on some other medium.

PARTS LIST

10 Film distribution system
20 Production studio
22 Content providers
24 Print films
26 Distribution network
28 Theater
30 Content films
32 Ad auction entry
34 Information field
36 Bid price entry field
38 Bid control button
46 Portable electronic device
50 Exhibitor site
52 Distributor
54 Advertiser
55 Ad entry
56 Control console
58 Operator
60 Theater
62 Play list
64 Time slot
64' Supplemental time slot
66 Start time
68 Duration
69 Assigned content
70 Selection step
72 Feature entry
74 Trailer selection step
76 Trailer
78 Trailer entry
80 Ad solicitation step
92 Broadcast step
94 Acceptance step
96 Scheduling step
100 Digital cinema preparation and distribution system
110 Studio
111 Post production facility
112 Film
114 Datacine system
116 Auxiliary input devices
118 Rendering system
120 Disk array
122 Transmitter
130 Transmission system
132 Magnetic medium
134 Optical medium
136 Fiber cable connection
138 Satellite
140 Exhibition system
142 Magnetic media reader
144 Optical media reader
146 Cinema operating system
148 Receiver
150 Digital projector
160 Back channel

What is claimed is:

1. A method for scheduling motion picture and promotional content to an audience at an exhibitor site, the method comprising:

(a) assembling an electronic play list for the motion picture and for related promotional content, said play list identifying at least one time slot for presentation of promotional content;

(b) posting an electronic notice soliciting a bid from an advertisement provider for purchase of said at least one time slot;

(c) in response to a received bid, associating an advertisement from said advertisement provider with said at least one time slot in said play list; and (d) acquiring said advertisement electronically from said advertisement provider.

2. A method for scheduling motion picture and promotional content according to claim 1 further comprising:

(e) obtaining an audience metric associated with said exhibitor site; and (f) providing said audience metric electronically to said advertisement provider.

3. A method for scheduling motion picture and promotional content according to claim 2 wherein the step of obtaining an audience metric comprises the step of counting.

4. A method for scheduling motion picture and promotional content according to claim 1 wherein the step of assembling an electronic play list comprises the step of conforming to rules provided as metadata with the digital motion picture.

5. A method for scheduling motion picture and promotional content according to claim 1 further comprising:

(d) obtaining an audience metric associated with said exhibitor site; and (e) inserting a new time slot into said electronic play list according to said audience metric.

6. A method for scheduling motion picture and promotional content according to claim 5 wherein the step of inserting a new time slot is performed by an operator.

7. A method for scheduling motion picture and promotional content according to claim 5 wherein the step of inserting a new time slot is performed by software.

8. A method for scheduling motion picture and promotional content according to claim 1 wherein the step of assembling an electronic play list is performed remotely from the exhibitor site.

9. A method for scheduling motion picture and promotional content according to claim 2 wherein the step of obtaining an audience metric is performed remotely from the exhibitor site.

10. A method for scheduling motion picture and promotional content according to claim 2 further comprising the step of computing an advertising rate based on said audience metric.

11. A method for scheduling motion picture and promotional content according to claim 1 wherein said motion picture is a digital motion picture.

12. A scheduling controller for a digital motion picture exhibitor, comprising a portable electronic device for maintaining an electronic play list for scheduling a digital motion picture presentation and advertising content upon receipt of auctioneering bids from advertising providers, the play list comprising at least a first time slot for assignment of the motion picture and a second time slot for assignment of an advertisement, said electronic device further comprising control logic for changing an assignment or time setting in said play list.

* * * * *